June 7, 1966  A. L. NASVYTIS  3,254,546
TOGGLE ACTION PLANETARY FRICTION DRIVE
Filed Nov. 14, 1962  3 Sheets-Sheet 1
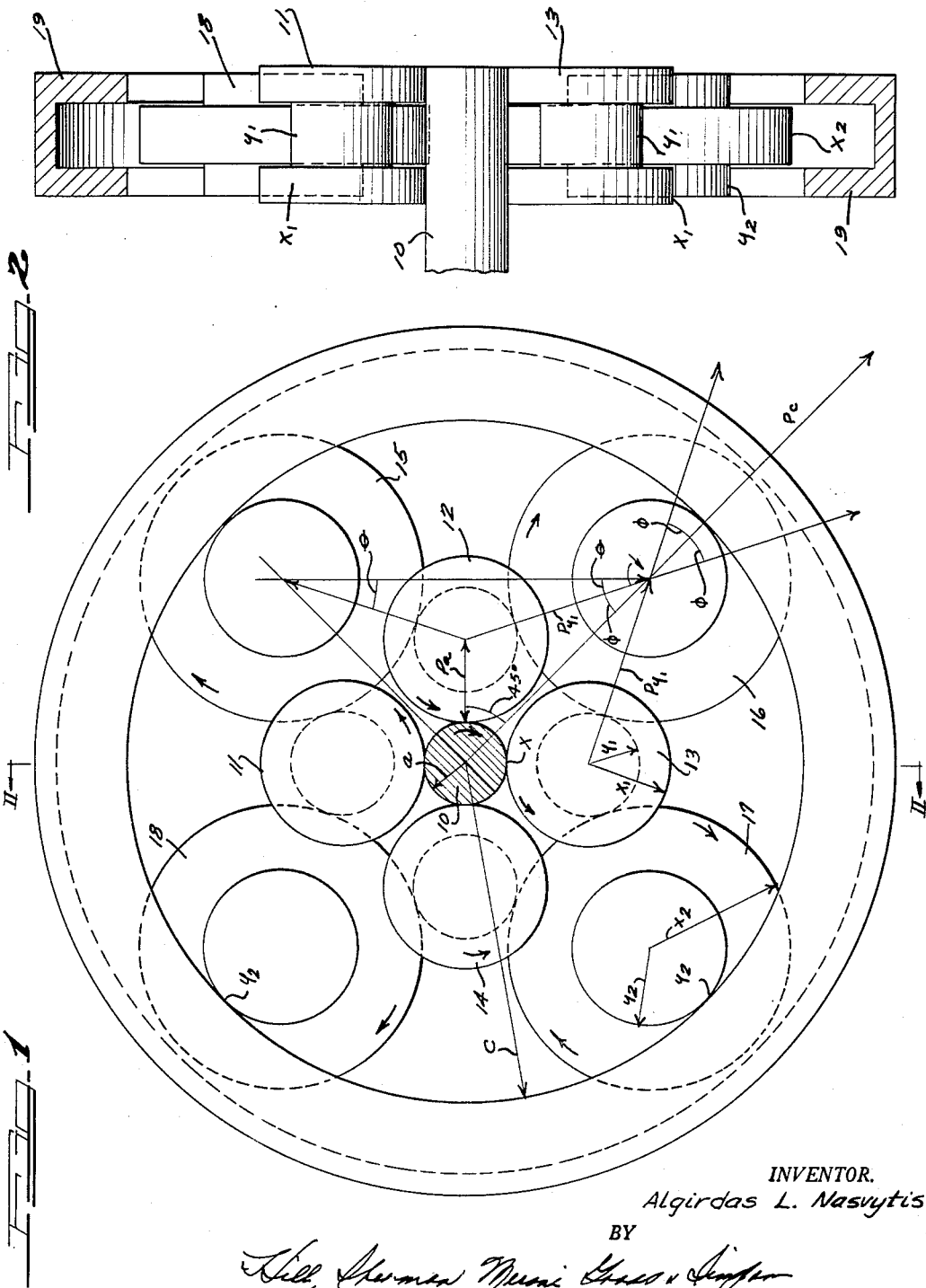
INVENTOR.
Algirdas L. Nasvytis
BY
ATTORNEYS June 7, 1966 A. L. NASVYTIS 3,254,546
TOGGLE ACTION PLANETARY FRICTION DRIVE
Filed Nov. 14, 1962 3 Sheets-Sheet 2
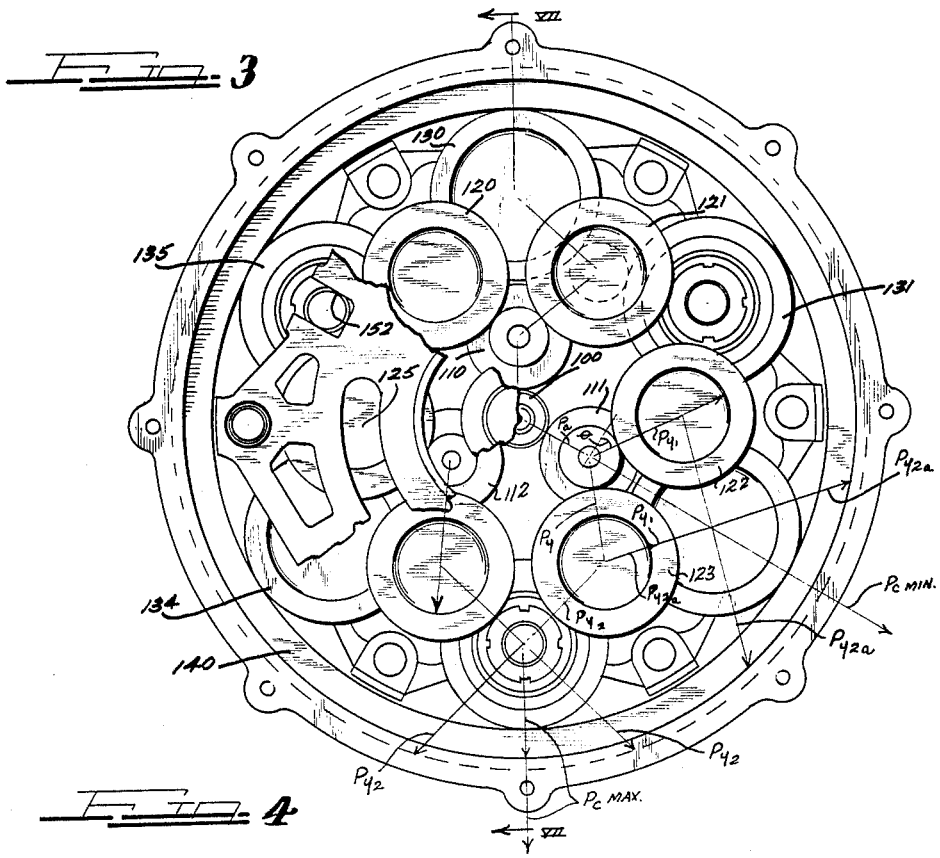
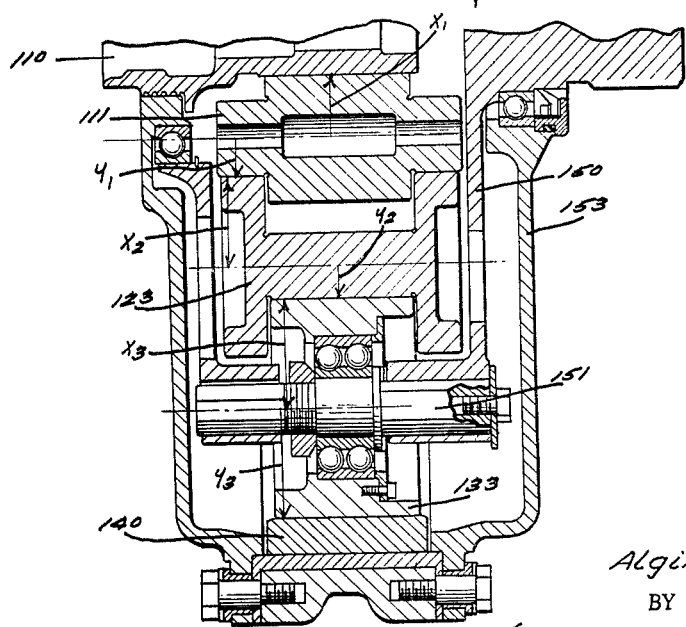
INVENTOR.
Algirdas L. Nasvytis
BY
ATTORNEYS June 7, 1966  A. L. NASVYTIS  3,254,546
TOGGLE ACTION PLANETARY FRICTION DRIVE
Filed Nov. 14, 1962  3 Sheets-Sheet 3

INVENTOR.
Algirdas L. Nasvytis
BY
ATTORNEYS

United States Patent Office 3,254,546
Patented June 7, 1966

3,254,546
TOGGLE ACTION PLANETARY FRICTION DRIVE
Algirdas L. Nasvytis, Cleveland, Ohio, assignor to TRW Inc., a corporation of Ohio
Filed Nov. 14, 1962, Ser. No. 237,629
1 Claim. (Cl. 74—798)

The present invention relates to planetary drive systems and is, more particularly, concerned with the provision of an improved high ratio planetary gear system in which the ratio achievable in a single plane, or stage, is substantially increased over prior devices in a simple and very efficient manner.

In my copending application Serial No. 132,406, filed August 18, 1961, I have described an improved, compound planetary type friction drive. With such drive, and with simple friction planetary gear drive heretofore known, reduction ratios of more than 12 or 15-to-1 were difficult to achieve without utilization of unduly large ring gears. Accordingly, where the outside diameter of the gear reduction unit was a significant design factor, several stages or planetary gear units have been required in series to provide the necessary ratio. The employment of several stages, however, poses design problems which in some cases are more serious than those imposed by increased diameter. For example, it is manifest that two drives in series will increase the total length of the device, the number of bearings employed therein, the weight of the unit and the complexity of the apparatus. Further, the second, or successive, stage of the drive has a much slower rate of rotation and a correspondingly higher torque which, for larger horsepower drives, can provide such a high pressure for friction drive transmission that the design length of the sun cylinder of the second stage must be substantially increased to reduce operating stress to a satisfactory level.

In accordance with the present invention multiple rollers are provided, in plural torque transmitting paths between the sun cylinder and ring cylinder. These multiple rollers are arranged so that all have a balanced pressure and, further, so that the pressure force on the input sun cylinder will be multiplied on the surface of the ring cylinder by the geometry of the contacts of the rollers thereby creating forces analogous to those of a toggle or wedge. In accordance with the present invention several variations in construction are satisfactory, three of which are specifically illustrated. These comprise a three-contact drive system employing two intermediate rollers between the sun cylinder and ring cylinder in each torque path, and two variations of four-contact drives with three intermediate rollers in each torque path between the sun cylinder and the ring cylinder. In the former construction a single toggle action is provided, while in the latter, a double toggle action is achieved. As a result of the arrangement of the friction gear drive as set forth in the present invention, it is possible to eliminate fixed bearings for the intermediate rollers since three support lines are provided for each of them, thereby satisfactorily fixing the axes thereof in space. The total number of bearings necessary in the drive is, therefore, substantially reduced as only a few bearings are employed, as a means of preventing counterrotation when the planets are held stationary.

It is, accordingly, an object of the present invention to provide an improved multiple roller power path planetary drive system.

Another object of the invention is to provide a planetary gear drive system employing a toggle action force transmission between friction rollers employed therein.

Still a further object of the present invention is to provide a balanced multiple roller planetary drive system wherein the rollers positioned between the sun and the ring are positively located by three lines of force application such that locating bearings may be eliminated.

A feature of the invention is the provision of a friction planetary drive having more than one friction roller positioned between the sun and the ring in each power path.

Yet another object of the present invention is to provide a substantially greater ratio change in a single axial stage planetary gear drive.

Another feature of the invention resides in utilization of a novel toggle action to provide a maximum torque transmission efficiency between friction gears in a planetary system.

Yet another feature of the invention resides in the construction of a planetary gear drive employing multiple rollers in each power path arranged to provide three contact lines for force transmission, thereby assuring proper parallelism between all drive components.

Still other and further objects and features of the present invention will at once become apparent to those skilled in the art from a consideration of the attached drawings wherein several embodiments of the present invention are shown by way of illustration only, and wherein:

FIGURE 1 is an end elevational view of a multiple roller friction planetary gear system constructed in accordance with the present invention;

FIGURE 2 is a side elevational view, in cross-section, taken along the line II—II of FIGURE 1;

FIGURE 3 is a further modified form of friction gearing employing double toggle action;

FIGURE 4 is a side elevational view, in cross-section, taken along the line VII—VII of FIGURE 3.

As shown on the drawings:

Figure 5:
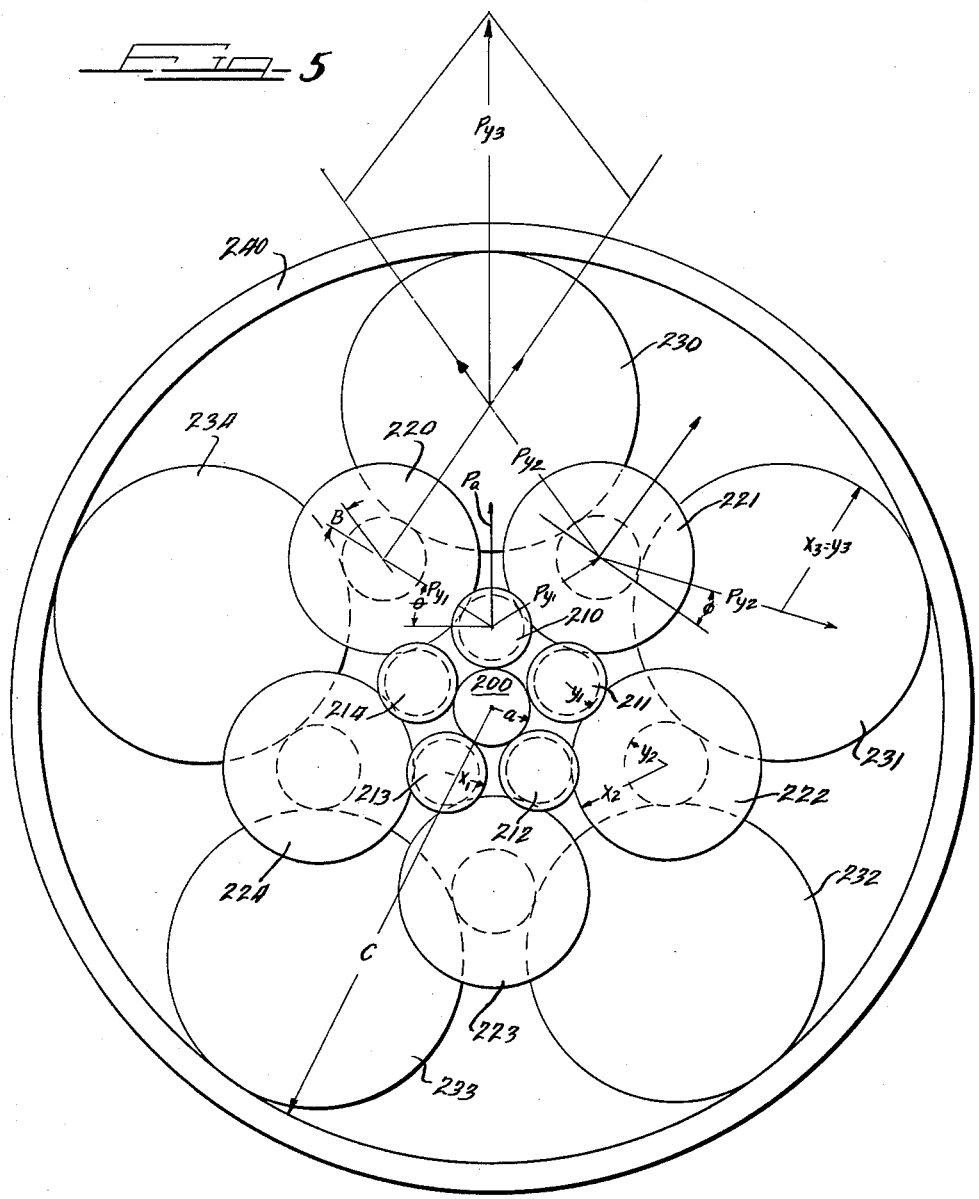
FIGURE 5 is a modified form of double toggle action friction gearing.

As may be seen from a consideration of FIGURE 1, a first embodiment of the invention comprises an input, or sun, cylinder 10 which is in frictional drive relation with four first planet members 11, 12, 13 and 14 which in turn are in frictional engagement with second planetary elements 15, 16, 17 and 18. The second planet elements 15, 16, 17, and 18 are in turn in friction drive relation with the ring cylinder 19. It will be observed that the sun cylinder 10 is constantly in driving condition with adjacent pairs of first planetary elements tending to wedge them outwardly and apart; and that the first planetary elements are themselves in the same outwardly acting wedging relation with pairs as second planetary elements. Thus, it will be seen, that all of the lateral loads acting against the first planet members are balanced in the driving condition and, similarly, the lateral loads of the second planetary members are baalnced relative to their axes. To increase the ratio to a maximum, the first planet rollers or elements 11, 12, 13 and 14 are provided with an input radius $x_1$ and a smaller output radius $y_1$.

Similarly, the second planet elements 15, 16, 17 and 18 are provided with an input radius of $x_2$ which is larger than the output radius $y_2$ in contact with the ring cylinder 19. Accordingly, when the planets are in a fixed carrier and sun 10 and ring 19 rotate, the total ratio of the planetary drive which is, of course, determined by the ratio of a single power path, bears the relationship $$R = \frac{x_1 x_2 c}{y_1 y_2 a}$$

where $c$ is the radius of the ring cylinder and $a$ is the radius of the sun.

The force $P_{y_1}$ acting on the contact between the first planetary elements, for example element 13, and a driven second planetary element 16 is amplified over the force $P_a$ acting on the member 13, with the force $P_{y_1}$ equalling $$\frac{P_a}{2 \sin \theta}$$

From the vector diagram shown in FIGURE 1 it can be seen that the output contact forces $P_c$ acting radially outwardly at each of the roller elements 15, 16, 17 and 18 may be defined as follows:

$$P_c = \frac{2 P_a \cos \phi}{2 \sin \theta}$$

or, alternatively, in the illustrated structure, with four planet elements, $$P_c = \frac{P_a \cos (45 - \theta)}{\sin \theta}$$

The necessary pressure force of the ring gear is, on the other hand, $$P_c = \frac{P_a R}{\frac{c}{a}} = \frac{x_1 x_2}{y_1 y_2} P_a$$

The necessary pressure on the $y_1 x_2$ contact between the individual first planetary elements and the second planetary elements equals $$P_{y_1} = \frac{P_a x_1}{2 y_1}$$

where $x_1/y_1$ is the multiplication factor due to decreased radius. The factor of 2 is due to the number of contacts at $y_1$ being twice the number at $a-x_1$. Equating $P_{y_1}$ from the force triangle and pressure requirement gives:

$$P_{y_1} = \frac{P_a}{2 \sin \theta} = \frac{P_a x_1}{2 y_1}$$

or, in other words, $$\frac{x_1}{y_1} = \frac{1}{\sin \theta}$$

By substituting this value into the $P_c$ pressure requirements it will be observed that $$P_c = \frac{P_a x_2}{\sin \theta y_2}$$

By equating both $P_c$ formulae we obtain $$\frac{P_a \cos (45 - \theta)}{\sin \theta} = \frac{P_a x_2}{\sin \theta \, y_2}$$

or, $$\frac{x_2}{y_2} = \cos (45 - \theta)$$

It will be observed, however, that such a relationship is impossible in the present instance since $x_2/y_2$ is greater than 1 in the design of the present apparatus. Accordingly, to maintain proper pressure on the ring cylinder 19 the pressure at $y_1 - x_2$ must be increased K times at which point $$P_{y_1} = \frac{P_a x_1}{2 y_1} K$$

By substituting again, $$K = \frac{x_1}{y \cos (45 - \theta)}$$

The planetary drive of the present system has only three contact points, all in a single stage. Therefore, it is more efficient than two simple planetary drives constructed in series and, accordingly, having four contact points with increased friction. As K approaches 2, the efficiency of the drive approaches the efficiency of the four contact drives. However, if K is more than 2, the efficiency decreases further. If has been found that such a single stage planetary drive having a ratio $R = 20-25$ has an efficiency comparable to or better than two drives in series with four contact points. Assuming a polished hardened steel rolling friction loss of .0006 in the transmission of the present invention, the frictional losses are minimized and the drive efficiency approximates .952. A larger over-all ratio than 25 will increase losses and the axial length of the drive.

It will be observed from a consideration of the direction of force application that upon assembly all of the planet components are prefectly balanced about their axes and, accordingly, it is unnecessary to provide bearings to positively position the various planets radially. Accordingly, fixed bearings in space are unnecessary and instead, all that is positively required to provide a satisfactorily operating planetary gear drive is an output cage or carrier element in which the axes of the planets 15, 16, 17 and 18 are peripherally fixed but free to move radially, if desired. Such an arrangement is illustrated in the embodiment of FIGURE 3 and will be more fully discussed below.

The proportions illustrated in the drive of FIGURE 1 provide a very satisfactory and extremely high ratio apparatus. There, the ratio, over-all, is 24 to 1 employing a 25,000 r.p.m. input with a 1041.7 r.p.m. output operating at 200 horsepower with the extremely small over-all radial diameter of 14.5 inches.

The transmission of torque between the friction rollers requires, of course, an initial loading of substantial proportions on the several friction gear surfaces. This may, of course, be accommodated in every instance through providing sufficient axial length of the various planets to reduce the stress levels to a satisfactory figure.

A double toggle action may be provided in a planetary gear embodying the present invention and such an arrangement is shown in FIGURES 3 and 4. As shown in FIGURES 3 and 4, a friction sun cylinder 100 is in friction drive contact with intermediate planets 110, 111, and 112 which are in turn in frictional drive relation with a second set of intermediate planets 120, 121, 122, 123, 124 and 125. The second set of intermediate planet members frictionally contact still a third set of planet members 130, 131, 132, 133, 134 and 135. This friction drive chain is well illustrated in the cross-sectional view of FIGURE 4 where the rotating sun member 110 drives first planet member 111 through a radius $x$ which in turn drives second planet member 123 via radii $y_1$ and $x_2$, which in turn drives planet member 133 by way of radius $y_2$ and $x_3$. The planet member 133 runs on ring 140 by way of radius $y_3$ which equals, in the present instance, radius $x_3$. The output of the drive illustrated in FIGURES 3 and 4 is taken from the planets by way of carrier 150 having bearings 151 peripherally fixing the planets 133 relative to the carrier 150 but permitting radial freedom as shown at 152 in FIGURE 3. The housing 153, to which the ring 140 is secured, is fixed.

A consideration of the lines of force acting internally of the planet drive system shown in FIGURES 3 and 4 shows that the over-all ratio R of the device equals $$\frac{cx_1x_2x_3}{ay_1y_2y_3}+1$$

Since in the example shown $y_3=x_3$, the over-all ratio is:

$$R=\frac{cx_1x_2}{ay_1y_2}+1$$

By using the structure of the present invention a very high ratio may be achieved with an extremely compact one-plane drive. The total number of friction contacts is exactly the same number as in two simple planetary drives in series. Where three first planet members are employed each of them has one friction contact with the sun and two friction contacts with the second planet members which are twice in number the number of first planet members. Similarly, each of the second planet members has one contact with a third planet member which similarly are twice in number the number of first planet members. Each third planet member has one friction contact with the ring 140.

If the pressure force on the first contact, at the surface of the sun member 100 is $$P_a=\frac{T}{na}K$$

where T is the drive input torque, n is the number of first contact rollers, a is the radius of the sun cylinder, and K is the pressure coefficient (as above noted, usually 20 to 25 for polished and hardened steel surfaces), the force necessary on the last, or ring, contact is $$P_c\frac{P_a\left(\frac{cx_1x_2x_3}{ay_1y_2y_3}\right)}{2\frac{c}{a}}$$

or, in other words, $$P_c\frac{P_a(x_1x_2x_3)}{2(y_1y_2y_3)}$$

To have a balance pressure drive, the factor $$\frac{x_1x_2x_3}{y_1y_2y_3}$$

is obtained by the toggle or wedging action in the rollers. The geometry of the toggle action is shown by the force arrows $P_a$, $P_{y1}$, $P_{y2}$, $P_{y2a}$, and $P_c$ minimum and $P_c$ maximum. It can be seen from FIGURE 3 that it is impossible to achieve an ideal force amplification in the apparatus there shown since the force $P_{y1}$ is at an acute angle to the symmetrical axis between the third planets 130, 132, 133, 134 and 135. Accordingly, rollers 130, 132 and 134 will each have a pressure smaller than rollers 131, 133 and 135, the latter of which will have a pressure 1.1 to 1.2 times greater than necessary. This variation in forces does not, however, seriously affect the efficiency of the over-all apparatus and it is possible through employment of several planet sets as illustrated, to provide an over-all ratio of approximately 60 to 1 in a single plane.

As in the embodiment illustrated in FIGURES 1 and 2, the only bearings necessary for the support of the planets are those required to transmit the output torque by way of carrier 150. Such bearings are shown in the third row but could, if preferred, be put on the second set of rollers since these planets will rotate at the same speed of rotation as the outer set. All of the roller clusters without fixed bearings can be made ideally floating and the pressure forces created by the slightly undersized ring gear will be ideally distributed between all of the rollers. In these circumstances such a friction drive is very attractive in the case where extremely high ratio and small horsepower are necessary. The construction can be made much more compact than conventional planetary systems.

A further modified form of the double toggle action drive is illustrated in FIGURE 5. There, the double toggle action is achieved without doubling the number of rollers in successive roller rows. Instead, the second intermediate rollers 220, 221, 222, 223, and 224 each have four contact supports rather than three. For example, roller 220 is in contact with rollers 210, 214, 230 and 234.

In the embodiment of FIGURE 5, the toggle action on the contact $y_1-x_2$ is $$P_{y1}=\frac{P_a}{2\sin\theta}$$

The roller $x_2$ has two forces which make the angle B with the radius, or, $$B=\left(90-\frac{180}{n}\right)-\theta$$

In the case illustrated $n=5$ and $B=(54°-\theta)$ and the resultant of these two toggle forces $2P_{y1}\cos(54°-\theta)$. The force between $y_2$ and $x_3$ is again multiplied by the second toggle action, with $$P_{y2}=\frac{2P_{y1}\cos(54°-\theta)}{2\sin\phi}$$

Substituting $$P_{y2}=\frac{P_a\cos(54°-\theta)}{2\sin\phi\sin\theta}$$

Each roller $x_3$ has two forces and the resultant force on the ring-roller contact is, in each case:

$$P_{y3}=P_c=\frac{P_a\cos(54°-\theta)\cos(54°-\phi)}{\sin\theta\sin\phi}$$

and is evenly balanced.

It will thus be seen that I have provided a novel friction planetary gear system capable of providing a very substantial reduction in ratio with only a single axial stage of gearing. The device is capable of carrying extremely high loads in a completely frictional form. It will be apparent to those skilled in the art that variations and modifications may be made in the structure described without departing from the scope of the novel concepts thereof. For example, a third doubling of rollers could be provided in the systems of FIGURES 3 and 5 to provide still further gear reduction. It is, accordingly, my intention that the invention be limited solely by the scope of the hereinafter appended claim.

I claim as my invention:

In combinaton in a friction planetary drive, a sun cylinder member, a ring cylinder member, a set of intermediate planet members comprising a number n greater than two cylinders equally spaced around said sun cylinder and in friction contact therewith, and additional intermediate planet members drivingly interposed between the members of said set and said ring cylinder and of a number 2n, said additional intermediate planet members each having friction drive relation with said ring member and at least one of the intermediate planet members of said set, each of said planet members having two effective friction drive diameters the largest of which is in drive relation with a member closer to the axis of rotation of said sun cylinder than said last named planet member and the smaller of which is in drive relation with a member further away from said axis of rotation of said sun member, a further additional set of planet members each of which members is in friction contact with said ring cylinder and two of said additional intermediate planet members whereby each planet member has three points of contact, and means peripherally fixing the planet members in one of the additional sets relative to each other.

References Cited by the Examiner

UNITED STATES PATENTS

| | | | |
|---|---|---|---|
| 1,117,446 | 11/1914 | Rodefeld | 74—798 |
| 1,190,662 | 7/1916 | Matteucci | 74—798 |
| 2,950,635 | 8/1960 | Bieger | 74—801 |

FOREIGN PATENTS

| | | |
|---|---|---|
| 53,682 | 9/1937 | Denmark. |
| 485,820 | 11/1917 | France. |
| 966,535 | 3/1950 | France. |
| 112,015 | 1/1919 | Great Britain. |
| 269,904 | 12/1927 | Great Britain. |

DON A. WAITE, *Primary Examiner.*

THOMAS C. PERRY, *Assistant Examiner.*